US008560684B2

(12) United States Patent
Ernst

(10) Patent No.: US 8,560,684 B2
(45) Date of Patent: *Oct. 15, 2013

(54) NETWORK TRANSACTION DISCOVERY

(75) Inventor: Theodore R. Ernst, Missouri City, TX (US)

(73) Assignee: BMC Software, Inc., Houston, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/174,744

(22) Filed: Jun. 30, 2011

(65) Prior Publication Data

US 2011/0264801 A1    Oct. 27, 2011

Related U.S. Application Data

(63) Continuation of application No. 11/153,303, filed on Jun. 15, 2005, now Pat. No. 7,996,515.

(51) Int. Cl.
*G06F 15/173* (2006.01)

(52) U.S. Cl.
USPC .......................................................... 709/224

(58) Field of Classification Search
USPC ................................................ 709/224, 203
See application file for complete search history.

(56) References Cited

U.S. PATENT DOCUMENTS

| 6,691,067 | B1 * | 2/2004 | Ding et al. ................ 702/186 |
| 7,047,291 | B2 * | 5/2006 | Breese et al. ............... 709/223 |
| 7,346,911 | B2 | 3/2008 | Goodman et al. |
| 7,412,502 | B2 * | 8/2008 | Fearn et al. ................ 709/223 |
| 7,996,515 | B2 * | 8/2011 | Ernst .......................... 709/224 |
| 2002/0038363 | A1 | 3/2002 | MacLean |
| 2002/0065912 | A1 | 5/2002 | Catchpole et al. |
| 2003/0055883 | A1 | 3/2003 | Wiles, Jr. |
| 2004/0103193 | A1 | 5/2004 | Pandya et al. |
| 2004/0122940 | A1 * | 6/2004 | Gibson et al. ............... 709/224 |
| 2004/0258066 | A1 | 12/2004 | Chen et al. |
| 2006/0036405 | A1 | 2/2006 | Byrd et al. |
| 2011/0029657 | A1 * | 2/2011 | Gueta et al. ................ 709/224 |

OTHER PUBLICATIONS

Final Office Action received for U.S. Appl. No. 11/153,303, mailed on Jul. 19, 2010, 21 pages.
Non-Final Office Action received for U.S. Appl. No. 11/153,303, mailed on Dec. 22, 2010, 18 pages.
Notice of Allowance received for U.S. Appl. No. 11/153,303, mailed on Jun. 9, 2011, 18 pages.
Response to Non-Final Office Action filed for U.S. Appl. No. 11/153,303, filed Mar. 18, 2011, 10 pages.

* cited by examiner

*Primary Examiner* — Lance L Barry

(57) ABSTRACT

Disclosed herein is a computer implemented technique for discovering the information technology resources that are involved in a particular networked business transaction. The system comprises three basic components. A robotic transaction playback client records the various steps in a particular transaction and can repetitively execute these steps to analyze the results. A network record collector observes the traffic throughout the network in response to the repeated instances of the transaction executed by the robotic transaction playback client. A backend processor analyzes the observations of network traffic to determine which ones are possibly tied to the transaction, and from this information determine which network components are part of the transaction being analyzed. Event timing information from a plurality of executions of a particular transaction are used to determine resource usage and paths.

20 Claims, 3 Drawing Sheets

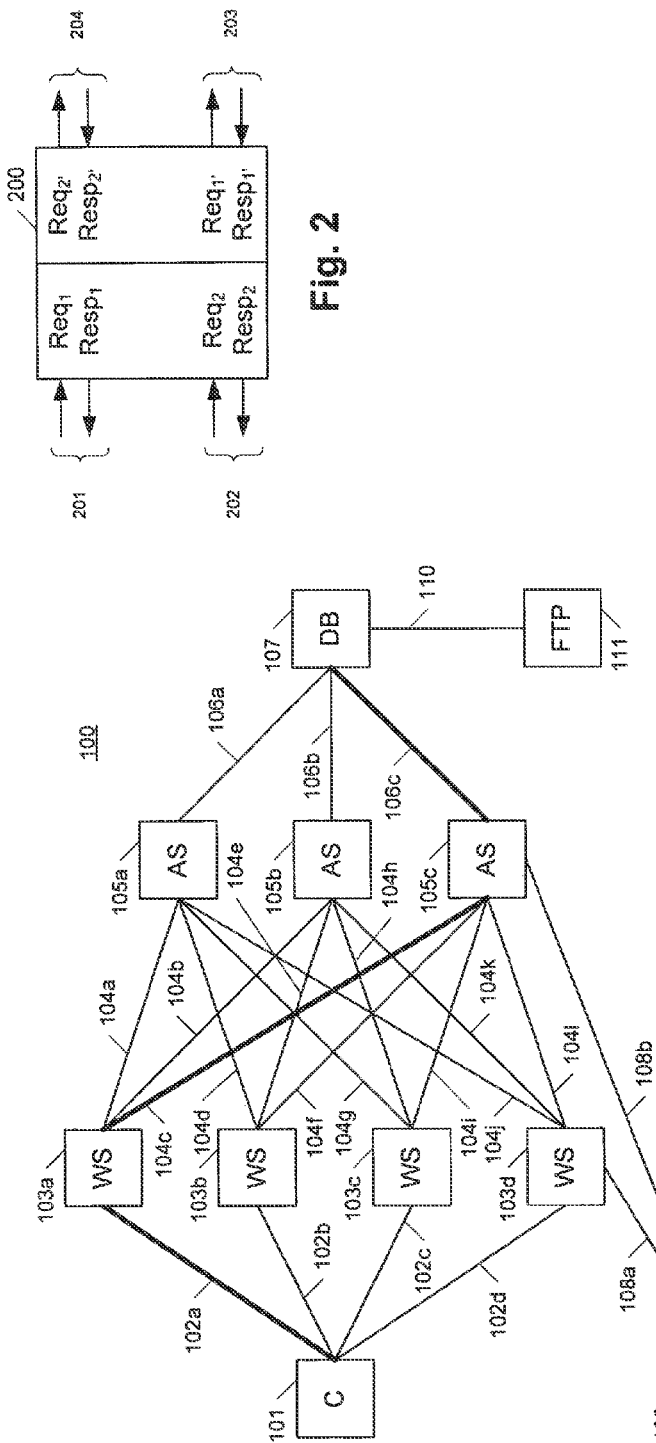
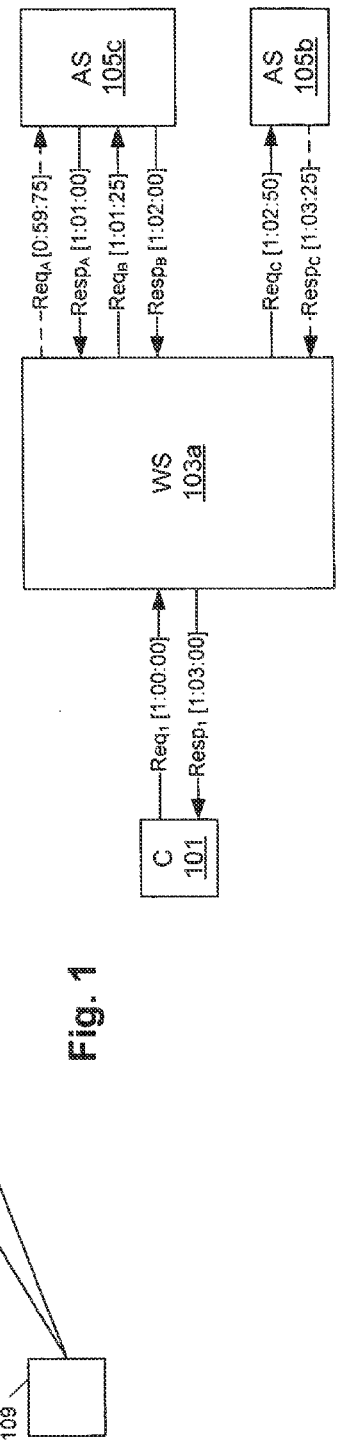
Fig. 1
Fig. 2
Fig. 3

NETWORK TRANSACTION DISCOVERY

CROSS REFERENCE TO RELATED APPLICATIONS

This application claims priority under 35 U.S.C. §120 and is a continuation of U.S. patent application Ser. No. 11/153,303, filed Jun. 15, 2005, entitled "NETWORK TRANSACTION DISCOVERY." The subject matter of this earlier filed application is hereby incorporated by reference.

BACKGROUND

Commercial transactions of nearly all sorts have become dependent on networked computing. Because of this, the business performance of many organizations has become tied to the performance of computer networks and various components of the networks. As these networked systems have evolved and businesses have become more dependent on them, tools have developed for network administrators to monitor the performance of the network and of the various network components. However, it has been difficult to transition the technical aspects of network and network component performance monitoring into the business aspects of network performance.

What is needed in the art is a way to link the performance of business tasks, i.e., transactions, to the underlying and supporting information technology ("IT") infrastructure. This linking serves three important functions, which may also be viewed as temporally sequential phases: discovery, diagnosis, and administration/prediction. The discovery function allows both business and technical managers to ascertain what IT components (clients, servers, network links, etc.) are used by a particular transaction, and, conversely, to determine what transactions require the use of a particular IT component. The discovery phase also helps to identify which transactions are affected by outages or other problems. Once this information is known, the second phase, diagnosis, allows business and technical managers to determine the cause of a performance problem with respect to a particular transaction and/or IT component and how to remedy the performance problem. Once the discovery and diagnosis phases are completed, business and technical managers can use this information administer existing resources (e.g., charge IT costs back to individual departments on a usage basis) and predict the need for future IT resources or scheduled maintenance, etc.

This need for information can be met by a system disclosed herein, which comprises computer software executable on a machine running on the computer network to discover the components of a particular transaction or service.

SUMMARY

The present invention relates to a computer implemented technique for discovering the information technology resources that are involved in a particular networked business transaction. The system comprises three basic components. A robotic transaction playback client records the various steps in a particular transaction and can repetitively execute these steps to analyze the results. A network record collector observes the traffic throughout the network in response to the repeated instances of the transaction executed by the robotic transaction playback client. A backend processor analyzes the observations of network traffic to determine which ones are possibly tied to the transaction, and from this information determine which network components are part of the transaction being analyzed. Event timing information from a plurality of executions of a particular transaction are used to determine resource usage and paths.

BRIEF DESCRIPTION OF THE DRAWINGS

FIG. 1 illustrates a typical computer network in which the present invention finds application along with a transaction path of a particular transaction of interest.

FIG. 2 illustrates message traffic into and out of a particular node for a group of transactions.

FIG. 3 illustrates message traffic into and out of a node and how traffic related to a particular node is identified.

DETAILED DESCRIPTION

Figure 4:
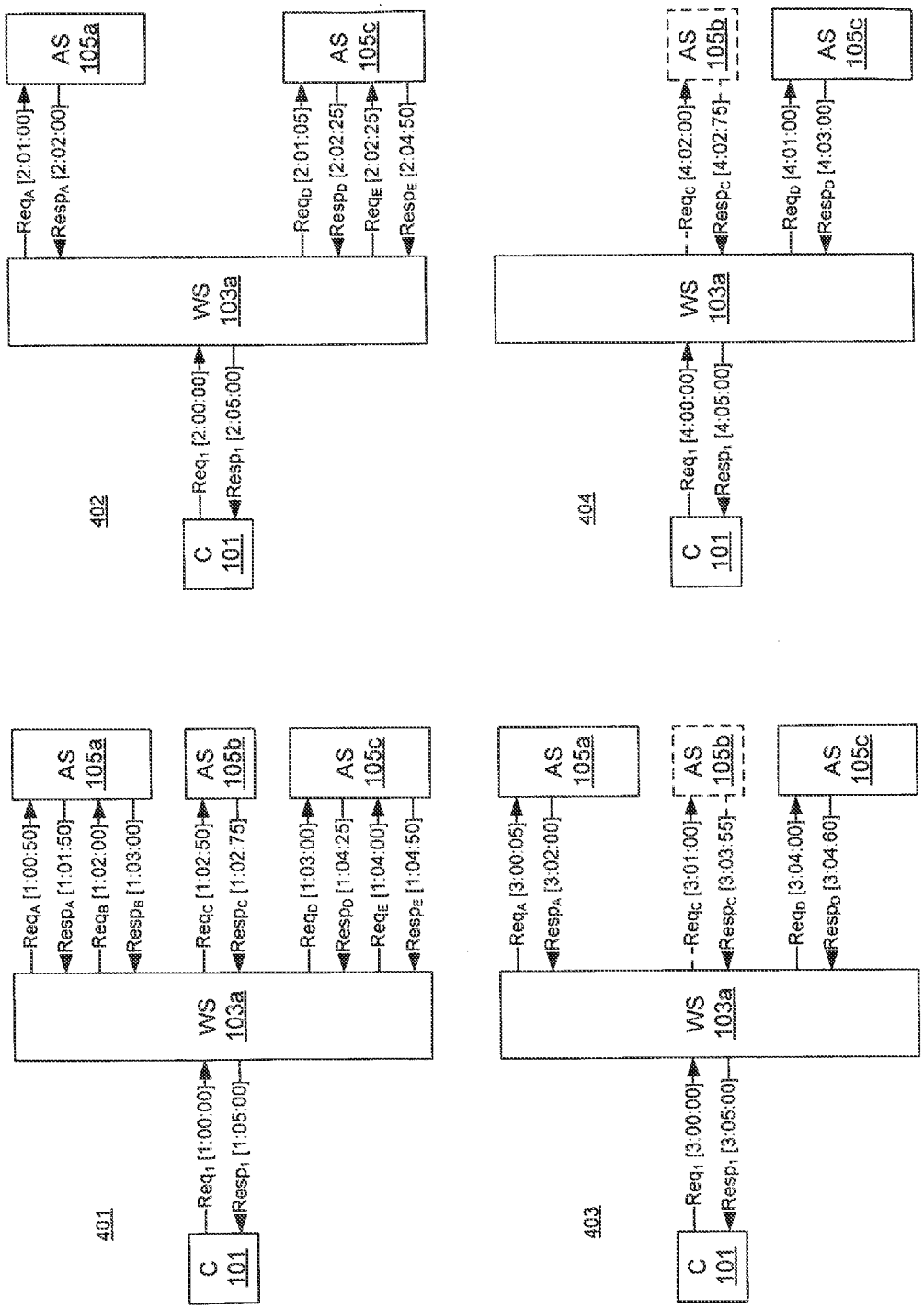
FIG. 4 illustrates a temporal sequence of executions of a transaction used to identify what network nodes are part of a given transaction.

A system for discovering an application transaction and what IT resources are used by the transaction is. described herein. The following embodiments of the invention, described in terms of applications and environments developed by BMC Software of Houston, Tex. are illustrative only and should not be considered limiting in any respect.

A typical computer enterprise in which the present invention finds application is schematically illustrated in FIG. 1. Network 100 comprises a plurality of network nodes of varying types. For example, a client computer 101 (also denoted "C") serves as the interaction point for a user. Network 100 also includes a plurality of web servers 103a-103d (also denoted "WS"). At any given time, client 101 may have one or more interactions 102a-102d to the web servers 103a-102d. Typically these interactions are implemented over Ethernet using hypertext transfer protocol (HTTP), although other connection types and protocols are also possible.

Network 100 also includes a plurality of application servers 105a-105c (also denoted "AS"). Typically web servers 103a-103d interact with application servers 105a-105c through a plurality of interactions 104a-104l. Typically interactions 104a-104l would also be implemented over Ethernet using HTTP, although other connection types and protocols may also be used. Additionally, it is also possible for a client computer to interact directly with an application server, e.g., client 109 is connected directly to application server 105c by connection 108b. In still another variations, one computer in network 100 could simultaneously function as a web server and as an application server.

Finally, network 100 includes a database server. 107 (also denoted "DB"). Typically the application servers 105a-105c will interact with database server 107 by interactions 106a-106c. Interactions 106a-106c would typically be implemented over Ethernet using SQL, although other connection types and protocols could also be used. It should also be noted that other computers may also interact directly with database server 107, e.g., FTP server 111 via connection 110.

The data flow for an exemplary client-server transaction is also depicted in FIG. 1. Suppose an client web-based application on client node 101 needs to interact in some way with a database application running on database server 107. One example might be an order entry system interacting with a sales database. The interaction will take the form of a transaction. Particularly, the client application will send data or a command (a "request") to the database node 107 and will receive some sort of data in return (a "response"). Several interactions as described in the preceding paragraphs may together make up a single transaction.

To process the transaction, client node 101 will send a request to web server 103$a$ via connection 102$a$. Client 101 will then wait for a response from web server 103$a$. To process the transaction, and provide the required response to client 101, web server 103$a$ will need to contact application server 105$c$. However, so far as client 101 node knows, it is interacting only with web server 103$a$. The transactions taking place on the back end of web server 103$a$ are not visible to client computer 101.

In response to the request from client 101 web server 103$a$ will issue a request of its own. This request goes, for example, to application server 105$c$ via connection 104$c$. As with the previous transaction step, so far as web server 103$a$ knows, it is only interacting with application server 105$c$. Any transactions taking place on the back end of application server 105$c$ are not visible to web server 103$a$. Finally, application server 105$c$ will issue a request to database server 107 over connection 106$c$. For purposes of this example, this is the endpoint of the transaction.

Database server will process the request it receives and return a response to application server 105$c$ over connection 106$c$. This response will correspond to the request issued by application server 105$c$ in response to the request it received from web server 103$a$. Application server will thus process the response received from database server 107 and send a response to web server 103$a$ over connection 104$c$. This response corresponds to the request sent by web server 103$a$, and thus web server will send a response to the initiating client 101. This completes the entire transaction. It should be noted that the web server may have several requests/responses to one or more application servers, the same as application servers would have with one or more data base servers.

As described briefly above, it is often advantageous to be able to track a transaction through the various nodes and to know which nodes are used by a particular transaction. However, because transactions on the backside of a server are not typically visible from the front side of the server, another approach must be used to track a transaction. This approach makes use of a synthetic transaction robot such as PATROL® End-to-End Response Timer ("ETE") available from BMC Software to define and drive a transaction. Based on information derived from ETE, it can be determined when a transaction truly starts and ends.

A first component of the transaction discovery system disclosed herein is the robotic transaction playback client. This component records the various components of a transaction in a fashion similar to a macro recorder in typical office suite type software. Once the transaction has been recorded, the system is able to replay the transaction multiple times and so that the resulting network traffic may be observed. As will be better understood with reference to the discussion below, the robotic transaction playback client may be configured to execute subsequent instances of a transaction at varying times and under varying network traffic conditions to allow the backend processor to uniquely identify specific nodes involved in a particular transaction and the behavior and performance of those nodes.

A second component of the transaction discovery system disclosed herein is a network record collector. The network record collector comprises a plurality of network probes that are used to collect discrete event information beginning with network flows. Each discrete event (for example, a request or a response) is recorded with relevant information about the event. Relevant information that is recorded (and later analyzed by the backend processor) includes, for example, originating network address and port, destination address and port, byte counts, and a timestamp, preferably with at least microsecond granularity. All of this information can be obtained by looking at the packet headers on the network, and it is not necessary to know the exact nature of the data being transmitted. This information is logged for each instance of a particular transaction being examined, and the aggregation of historical network flows are examined by the backend processor to determine which nodes a transaction goes through. Other events such as operating system or database events help determine activity within a node that is also tied to a transaction.

The third component of the system is the backend processor, operation of which will be described with reference to FIGS. 2 and 3. Backend processing generally takes in information from the robotic transaction player and the network probes. This information is analyzed with a goal of correlating network activities to the robotically executed transaction. This process may be better understood with reference to FIG. 2, in which a generic server node 200 is illustrated. Server node 200 receives a plurality of incoming requests, $Req_1$ and $Req_2$ from one or more nodes over connections 201 and 203, respectively. These incoming requests are processed by server 200, and server 200 issues further outgoing requests to another server (or servers), not shown, to complete the transaction. Outgoing request $Req_{1'}$ corresponds to incoming request $Req_1$ and is sent out over connection 204. Outgoing request $Req_{2'}$ corresponds to incoming request $Req_2$, and is sent out over connection 204.

Incoming response $ResP_{1'}$, corresponding to $Req_{1'}$, is received over connection 203, and incoming response $Resp_{2'}$, corresponding to $Req_{2'}$, is received over connection 204. These responses are processed by server 200, and outgoing response $Resp_1$, corresponding to incoming request $Req_1$ and incoming response $Resp_{1'}$, is returned over connection 201. Similarly, outgoing response $Resp_2$, corresponding to incoming request $Req_2$ and incoming response $Resp_{1'}$ is returned over connection 202.

From the sequence of these responses and requests, it can ultimately be determined which nodes are involved in a particular transaction. (Sequence information is determined from the timestamps associated with each request and response, not shown, but described below with reference to FIG. 3.)

Illustrated in FIG. 3 is a simple example involving one portion of the network 100 illustrated in FIG. 1. Client 101 issues a request $Req_1$ to web server 103$a$. This request occurs at time 1:00:00. (Although the times are indicated in a particular format, it should be understood that any timestamp in any format would be usable in conjunction with the teachings herein. Additionally, specific values shown for each time stamp are exemplary only.) Web server 103$a$ responds to this request at time 1:03:00 with response $Resp_1$. To determine what other nodes are involved in the transaction, a monitoring program monitors the traffic on the backside of web server 103$a$ for the time between 1:00:00 and 1:03:00.

Suppose that during this period, three request/response pairs having some network traffic occurring during the time period between 1:00:00 and 1:03:00 are identified: $Req_A/Resp_A$, $Req_B/Resp_B$, and $Req_C/Resp_C$. Request/response pairs $Req_A/Resp_A$ and $Req_B/Resp_B$ involve application server 105$c$, and request/response pair $Req_C/Resp_C$ involves application server 105$b$. Analysis of these request/response pairs, and their timing, can be used to determine which application server is involved in the transaction initiated by client 101.

For example, it can be determined that request/response pair $Req_A/Resp_A$ is not part of the relevant transaction, because request $Req_A$ was made by web server 103a at time 0:59:75, which is before the web server received the transaction initiating request $Req_1$ from client 101 at time 1:00:00. Further because RespC is received at 1:03:25, which is after Resp1 at 1:03:00, it can be determined that request/response pair $Req_C$Resp$_C$ is not part of the relevant transaction. Because request/response pair $Req_B/Resp_B$ is the only request/response pair during the relevant time frame, it can be determined that application server 105c is part of in the transaction in question.

In this simple example, it is clear that request/response pair $Req_B/Resp_B$ is communication that is relevant to the monitored transaction and application server 105c is the relevant node. By looking at the traffic that occurred on the backside of application server 105c during the time period between time 1:01:25 (the time of request $Req_B$) and 1:02:00 (the time of response $Resp_B$), it can similarly be determined which nodes downstream of application server 105c are involved in the transaction. By recursively analyzing traffic from subsequently further removed layers of the network, it can be determined which nodes are part of the relevant transaction.

Of course in any real world network, the traffic patterns will be substantially more complex than that described above. In such a case it is likely that there will be multiple request/response pairs that occur completely within the relevant timeframe. Additionally, it is likely that there may be multiple servers involved with these request response pairs. Many of these multiple servers may actually act as one server, e.g., a server farm or cluster that is addressed separately. The backend process is able to recognize this. In any case, it is likely that each step in a transaction could be uniquely identified by repeated application of the analysis technique described above. A slightly more complicated example is illustrated in FIG. 4.

FIG. 4 illustrates four successive executions 401-404 of the technique described with respect to FIG. 3. Each of these executions is a playback of the recorded transaction by the robotic transaction playback client. In the first execution 401, client 101 initiates a transaction by sending request $Req_1$ at time 1:00:00 to web server 103a. The transaction is concluded when client 101 receives response $Resp_1$ from web server 103a at time 1:05:00. The backend traffic from web server 103a during the time period between 1:00:00 and 1:00:05 consists of five request response pairs. Request/response pairs $Req_A/Resp_A$ and $Req_B/Resp_B$ are sent to/received from application server 105a. Request response pair $Req_C$Resp$_C$ is sent to/received from application server 105b. Finally, request response pairs $Req_D/Resp_D$ and $Req_E/Resp_E$ are sent to/received from application server 105c. From this execution of the probing routine, it cannot be determined which one of application servers 105a-105c is involved in the transaction.

A second execution 402 provides additional information. As in the first execution, the transaction is begun by request $Req_1$ at time 2:00:00 and is concluded by response $Resp_1$ at time 2:05:00. However, during the intervening time period there are only three request/response pairs on the backend of web server 103a. Request/response pair $Req_A/Resp_A$ is sent to/received from application server 105a. Request/response pairs $Req_D/Resp_D$ and $Req_E/Resp_E$ are sent to/received from application server 105c. Because there is no request/response pair sent to application server 105b, it can be determined that application server 105b is not part of the transaction. However, it cannot yet be determined whether application server 105a or application server 105c is part of the relevant transaction.

It is thus necessary to monitor a third execution 403 of the transaction. As before, the endpoints of the transaction are request $Req_1$ sent from client 101 to web server 103a at time 3:00:00 and response $Resp_1$ received by client 101 from web server 103a at time 3:05:00. During the relevant time period, there are three request/response pairs on the backend of web server 103a. Reqeust/response pair $Req_A/Resp_A$ is sent to/received from application server 105a; request/response pair $Req_C$Resp$_C$ is sent to/received from application server 105b; and request/response pair $Req_D/Resp_D$ is sent to/received from application server 105c. However, in the previous execution of the transaction it was determined that application server 105b was not part of the transaction, therefore request/response pair $Req_C$Resp$_C$ can be eliminated from consideration, even though it involves a request response pair during the relevant time period. The third execution 403 thus provides no additional information for narrowing down the application server that is part of the transaction.

Therefore, a fourth execution 404 is required. Like the previous three executions, the transaction is defined as the time period between the originating request $Req_1$ sent from client 101 to web server 103a at time 4:00:00 and the terminating response $Resp_1$ received by client 101 from web server 103a at time 4:05:00. During the relevant time period, there are two request/response pairs on the backend of web server 103a. Request/response pair $Req_c/Resp_c$ is sent to/received from application server 105b, and request/response pair $Req_D/Resp_D$ is sent to/received from application server 105c. From previous executions it is known that application server 105b is not part of the transaction, and thus it is known that the application server required by the transaction is application server 105c.

In a sufficiently busy and/or complicated network, it may be that there is so much backend traffic on an affected node that it is impossible to identify with 100% certainty which downstream node is part of the relevant transaction, even with a substantial number of executions of the method described herein. Nonetheless, in these cases, it is still possible to establish a probability for each downstream node being the relevant node of the transaction.

Figure 5:
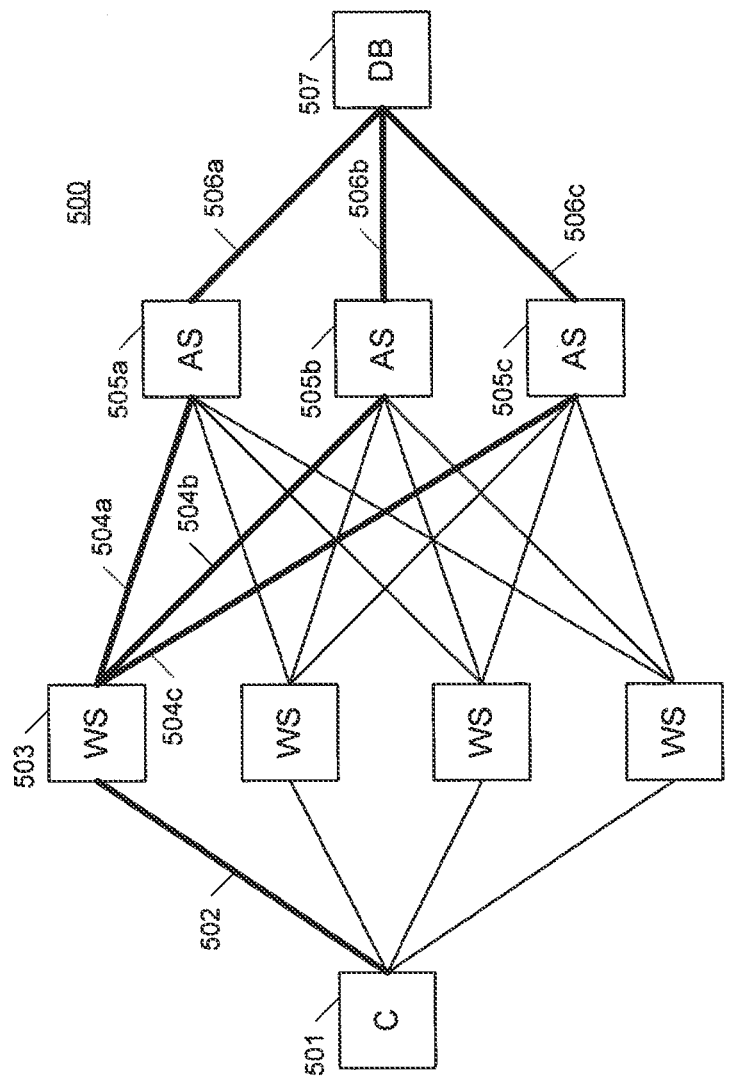
FIG. 5 illustrates a network in which it cannot be absolutely determined what network nodes are part of a given transaction because more than one path cannot be isolated.

Various heuristic methods are possible to determine the probability that a given node is part of a particular transaction. One approach to establishing such probabilities may be better understood with respect to FIG. 5. Network 500 is of substantially similar topology to network 100 discussed above with respect to FIG. 1. It is desired to know what network resources are used by a particular transaction executed by client 501. Repeated executions of the transaction by the robotic transaction playback client. However, unlike the case illustrated in FIG. 4, the data collected from the network record collectors may not identify a single unique transaction path.

For example, it can clearly be determined that the transaction executed by client 501 requires interaction with web server 503 over communication link 502. However, it may not be possible to derive from the traffic patterns whether the transaction ends at web server 503 or whether the transaction further requires interaction between web server 503 and one of application servers 505a, 505b, or 505c over network links 504a, 504b, or 504c, respectively. On busy networks, there is likely to be additional traffic between these nodes that is temporally coincident with the request response pair from client 501 corresponding to the transaction of interest. Furthermore, the traffic patterns may not clearly indicate whether the transaction ends with one of the application servers 505a-505c or whether further interaction is required with database server 507 over one of communication links 506a, 506b, or 506c. Thus, for purposes of this example, assume that seven possible transaction paths have been identified: (1) 501-503, (2) 501-503-505a, (3) 501-503-505b, (4) 501-503-505c, (5) 501-503-505a-507, (6) 501-503-505a-507, and (7) 501-503-505a-507.

Initially, equal probabilities are assigned to each of the transaction paths. Thus with seven possible paths, there is a 14.285% chance that one of these paths is the correct transaction path. The backend processor thus assigns a 14.285% probability to each of the identified paths. However, as noted above, more than timing information of a request response pair is monitored by the network record collector. Other information—for example, byte counts—are also monitored. If there is additional correlation of one of these additional parameters between one or more of the identified potential transaction paths, it is flagged as being higher priority.

Once this additional information has been identified for each path, the paths that have been flagged as being a higher priority are assigned an adjusted probability to account for the higher likelihood that it is the correct path. This adjusted probability may be determined by various methods. One method is to adjust the probability by adding 10% of the base probability of the path times the number of nodes by which the particular endpoint is removed from client. So, for purposes of the example depicted in FIG. 5, assume that only the path 501-503-505b were flagged as higher probability. Server 505b is two endpoints removed from client 501, so the adjusted probability is 14.285+(1.4285*2)=17.142. However, because the probability of this node has been increased without decreasing the probability of the other nodes, it is necessary to rescale the probabilities, which is done by summing the adjusted probabilities and using this sum as a divisor against the individual probabilities. With only one path adjusted, the sum would be (14.285*6)+17.142=102.852. The probability for the adjusted node is then 17.142/102.852=16.667%, and the probability for the remaining nodes is 14.285/102.852=13.889%. As would be apparent to one skilled in the art, recursive application of this algorithm, or any similar probability adjustment algorithm, would ultimately allow the node involved in a transaction to be identified with relative certainty.

A method and system for discovering information technology resources involved in a particular network transaction have been disclosed herein. While the invention has been disclosed with respect to a limited number of embodiments, numerous modifications and variations will be appreciated by those skilled in the art. It is intended that all such variations and modifications fall with in the scope of the following claims.

What is claimed is:

1. A system for identifying server resources used in one or more network transactions, the system comprising:
    a robotic transaction playback client configured to record and replay the one or more network transactions related to a client and the server resources during a time interval;
    a network record collector configured to record network traffic information including discrete events during the time interval of the one or more network transactions; and
    a backend processor configured to analyze the network traffic information including the discrete events recorded during the time interval by the network record collector in response to replay of the one or more network transactions by the robotic transaction playback client and identify a specific server resource from the server resources used in the one or more network transactions with the client based on the analysis of the network traffic information including the discrete events during the time interval.

2. The system of claim 1 wherein the robotic transaction playback client is configured to replay the one or more network transactions at varying times.

3. The system of claim 2 wherein the robotic transaction playback client is configured to replay the one or more network transactions under varying network traffic conditions.

4. The system of claim 3 wherein the network traffic information recorded by the network record collector includes one or more parameters including one or more of originating network address, originating network port, destination network address, destination network port, message size, number of responses to a request, and a timestamp.

5. The system of claim 1 wherein analyzing the network traffic information recorded by the network record collector in response to replaying of the one or more network transactions executed by the robotic transaction playback client to identify the specific server resource from the server resources used in the one or more network transactions includes identifying a plurality of nodes belonging to a single logical group of nodes and identifying any of the plurality as a single node.

6. A method of identifying network server resources involved in a network transaction, the method comprising:
    recording one or more components of the network transaction related to a client and the network server resources during a time interval;
    executing the recorded network transaction one or more times during the time interval;
    recording discrete event information by collecting one or more data sets from a plurality of network probes with each of the one or more data sets uniquely corresponding to at least one execution of the recorded network transaction; and
    analyzing the collected data sets related to the discrete event information recorded during the time interval in response to each execution of the network transaction and identifying the network server resources including a specific network server resource from the network server resources involved in the network transaction with the client based on the analysis of the collected data sets during the time interval.

7. The method of claim 6 wherein analyzing the collected data further comprises:
    identifying a beginning time of the transaction during the time interval by identifying the time of an initial request sent by a client executing the transaction;
    identifying an ending time of the transaction during the time interval by identifying the time of a response to the initial request; and
    identifying a first network resource of the network resources involved in the transaction by identifying the destination of the initial request.

8. The method of claim 7 wherein analyzing the collected data further comprises:
    identifying one or more request/response pairs sent/received by the first network resource between the beginning time of the transaction and the ending time of the transaction; and
    identifying one or more potential additional network resources of the network resources potentially in the transaction by identifying the destination/source of each of the identified request/response pairs.

9. The method of claim 8 further comprising recursively analyzing data of the collected data sets to eliminate one or more network resources of the network resources not involved in the transaction.

10. The method of claim 8 wherein identifying one or more potential additional network resources further comprises assigning a probability to each potential additional network resource.

11. The method of claim 10 wherein the probability is heuristically determined.

12. The method of claim 10 wherein assigning a probability to each potential network resource comprises:
   identifying a plurality of network paths potentially corresponding to the transaction;
   assigning equal base probabilities to each of the plurality of network paths;
   analyzing one or more additional parameters relating to network traffic observed on each of the plurality of network paths and flagging each of the plurality of network paths wherein the one or more additional parameters indicate a stronger correlation with the transaction; and
   assigning new probabilities to each of the plurality of network paths, wherein the new probability for each flagged path increased and the new probability for each remaining path is decreased relative to the base probabilities.

13. The method of claim 12 wherein assigning new probabilities to each of the plurality of network paths further comprises:
   for each flagged network path, increasing the base probability by a predetermined percentage of the base probability multiplied by the number of nodes by which an endpoint of the network path is removed from a client originating the transaction to generate an intermediate probability;
   summing the intermediate probabilities for each flagged network path and the base probabilities for each non-flagged network path to obtain a new probability sum; and
   assigning a new probability for each network path wherein, for each flagged network path, the new probability is the intermediate probability divided by the new probability sum, and wherein, for each non-flagged network path, the new probability is the base probability divided by the new probability sum.

14. The method of claim 6 wherein analyzing the collected data sets and identifying network resources involved in the transaction comprises identifying a plurality of nodes belonging to a single logical group of nodes and thenceforth identifying each of the plurality of nodes as a single node.

15. A non-transitory machine readable medium, having embodied thereon instructions executable by the machine to perform a method according to claim 6.

16. A non-transitory machine readable medium, having embodied thereon instructions executable by the machine to perform a method according to claim 9.

17. A non-transitory machine readable medium, having embodied thereon instructions executable by the machine to perform a method according to claim 10.

18. A non-transitory machine readable medium, having embodied thereon instructions executable by the machine to perform a method according to claim 11.

19. A non-transitory machine readable medium, having embodied thereon instructions executable by the machine to perform a method according to claim 12.

20. A non-transitory machine readable medium, having embodied thereon instructions executable by the machine to perform a method according to claim 13.

\* \* \* \* \*